United States Patent
Chandra Sekar Rao et al.

(10) Patent No.: US 11,410,121 B2
(45) Date of Patent: Aug. 9, 2022

(54) PROACTIVELY PREDICTING LARGE ORDERS AND PROVIDING FULFILLMENT SUPPORT RELATED THERETO

(71) Applicant: EMC IP Holding Company LLC, Hopkinton, MA (US)

(72) Inventors: Venkata Chandra Sekar Rao, Bangalore (IN); Abhishek Gupta, Bangalore (IN); Rashmi Sudhakar, Bangalore (IN); Sham A R, Bangalore (IN); Peter Shipman, Maynard, MA (US); Sumit Gupta, Bangalore (IN); Velmurugan R, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 510 days.

(21) Appl. No.: 15/964,760

(22) Filed: Apr. 27, 2018

(65) Prior Publication Data
US 2019/0333001 A1  Oct. 31, 2019

(51) Int. Cl.
*G06Q 10/08* (2012.01)
*G06Q 10/04* (2012.01)
(Continued)

(52) U.S. Cl.
CPC ........... *G06Q 10/087* (2013.01); *G06F 17/16* (2013.01); *G06F 17/18* (2013.01); *G06N 3/08* (2013.01); *G06Q 30/0206* (2013.01)

(58) Field of Classification Search
CPC .............. G06F 16/285; G06F 16/2379; G06F 16/24565; G06F 16/24578; G06F 16/3326;
(Continued)

(56) References Cited

U.S. PATENT DOCUMENTS 8,024,219 B2  9/2011  Woehler
8,027,860 B2  9/2011  John
(Continued)

OTHER PUBLICATIONS https://www.bc.edu/content/dam/files/schools/cas_sites/cs/pdf/academics/honors/16Lu.pdf (Year: 2016).*
(Continued)

*Primary Examiner* — Ariel J Yu
*Assistant Examiner* — Dana Amsdell
(74) *Attorney, Agent, or Firm* — Ryan, Mason & Lewis, LLP (57) ABSTRACT

Methods, apparatus, and processor-readable storage media for proactively predicting large orders and providing fulfillment support related thereto are provided herein. An example computer-implemented method includes classifying, via a first set of one or more machine learning techniques, a transaction quote as a transaction quote that exceeds one or more size-related parameters or a transaction quote that does not exceed the one or more size-related parameters; determining, if the transaction quote is classified as a transaction quote that exceeds one or more size-related parameters, supportability of converting the transaction quote into a transaction order via a second set of one or more machine learning techniques; and outputting, based on the determined supportability, information pertaining to converting the transaction quote into a transaction order and fulfilling the transaction order to one or more entities associated with transaction order fulfillment.

20 Claims, 6 Drawing Sheets

(51) Int. Cl.
*G06Q 30/02* (2012.01)
*G06N 3/08* (2006.01)
*G06F 17/16* (2006.01)
*G06F 17/18* (2006.01)

(58) Field of Classification Search
CPC .. G06F 16/338; G06F 16/951; G06F 21/6218; G06F 7/14; G06F 9/505; G06N 20/00; G06N 5/04; G06N 7/005; G06N 20/10; G06N 3/0445; G06N 3/0454; G06N 3/0481; G06N 3/08; G06N 3/082; G06N 3/084; G06N 5/022; G06N 5/046
See application file for complete search history.

(56) References Cited

U.S. PATENT DOCUMENTS

| | | | |
|---|---|---|---|
| 8,050,957 B2 | 11/2011 | Woehler | |
| 8,050,958 B2 | 11/2011 | Woehler | |
| 8,200,521 B2 | 6/2012 | Hader | |
| 8,468,544 B1 | 6/2013 | Becket et al. | |
| 8,799,061 B1* | 8/2014 | Chatterjee | G06Q 30/0269 705/14.1 |
| 10,713,706 B1* | 7/2020 | Thankachan | G06N 7/005 |
| 2004/0015461 A1* | 1/2004 | Lo | G06N 3/02 706/52 |
| 2011/0119210 A1* | 5/2011 | Zhang | G06N 20/00 706/12 |
| 2011/0289090 A1* | 11/2011 | Zhou | G06F 16/3349 707/740 |
| 2014/0201126 A1* | 7/2014 | Zadeh | A61B 5/165 706/52 |
| 2016/0092803 A1* | 3/2016 | Boyacigiller | G06F 16/00 705/7.27 |
| 2016/0378771 A1* | 12/2016 | Tholiya | G06F 16/285 707/731 |
| 2017/0330123 A1* | 11/2017 | Deshpande | G06Q 30/0206 |
| 2018/0025407 A1* | 1/2018 | Zhang | G06Q 10/02 705/26.81 |
| 2018/0121829 A1* | 5/2018 | Chowdhary | G06Q 10/08 |
| 2018/0204111 A1* | 7/2018 | Zadeh | G06N 3/0436 |
| 2018/0365441 A1* | 12/2018 | Guttmann | G06N 5/022 |
| 2019/0243691 A1* | 8/2019 | LaBute | H04L 41/145 |

OTHER PUBLICATIONS

Patrick, K., Supply Chain Dive, ThinkSCM Launches Analytics Tool to Forecast Customer Demand, Oct. 19, 2017.

* cited by examiner

PROACTIVELY PREDICTING LARGE ORDERS AND PROVIDING FULFILLMENT SUPPORT RELATED THERETO

FIELD

The field relates generally to information processing systems, and more particularly to techniques for managing orders using such systems.

BACKGROUND

Large orders can often drive revenues across different enterprises as well as different business units within such enterprises. However, large orders can also introduce supply chain challenges. Additionally, information pertaining to such supply chain challenges are commonly not available in a timely fashion to sales representatives and/or other entities carrying out the obtainment and/or execution of orders. Consequently, conventional order management approaches can result in incorrect demand views, forecast errors, reduced quote-to-order conversions, lost business, etc.

SUMMARY

Illustrative embodiments of the invention provide techniques for proactively predicting large orders and providing fulfillment support related thereto. An exemplary computer-implemented method can include classifying a transaction quote as a transaction quote that exceeds one or more size-related parameters or a transaction quote that does not exceed the one or more size-related parameters, wherein classifying includes applying a first set of one or more machine learning techniques to the transaction quote and one or more variables related to the transaction quote. Such a method can also include determining, if the transaction quote is classified as a transaction quote that exceeds one or more size-related parameters, supportability of converting the transaction quote into a transaction order, wherein determining supportability includes applying a second set of one or more machine learning techniques to multiple attributes related to converting the transaction quote into a transaction order. Further, such a method can include outputting, based on the determined supportability, information pertaining to converting the transaction quote into a transaction order and fulfilling the transaction order to one or more entities associated with transaction order fulfillment.

Illustrative embodiments can provide significant advantages relative to conventional order management approaches. For example, challenges associated with incorrect demand views and reduced quote-to-order conversions are overcome through determining trends with respect to large orders and predicting supportability conversion rates with drill-down views. Such large order predictions and related fulfillment support enables the reduction of order fulfillment delays, thereby increasing brand reliability and customer experience quality.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
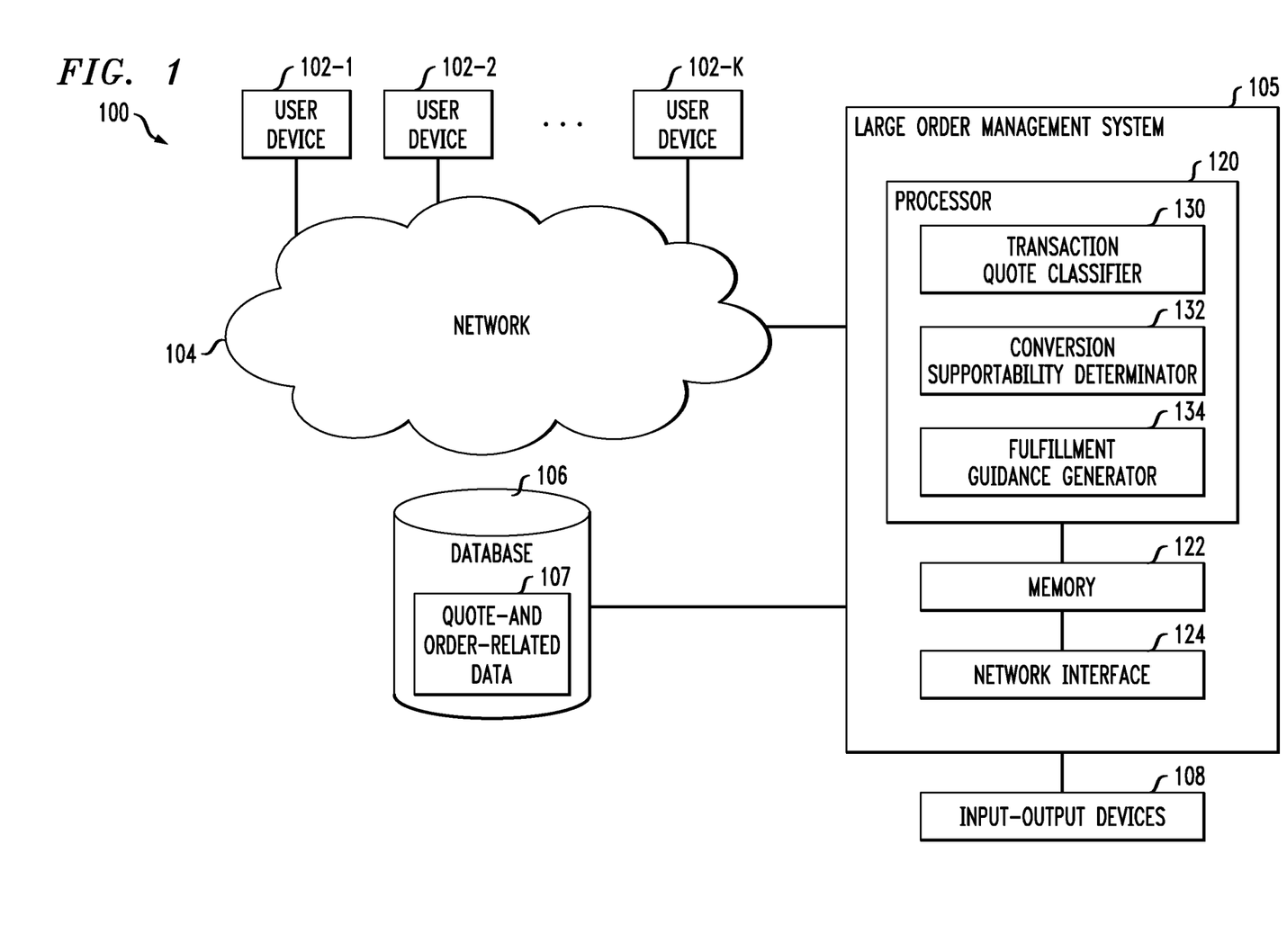
FIG. 1 shows an information processing system configured for proactively predicting large orders and providing fulfillment support related thereto, in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a large order management system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The large order management system 105 has an associated database 106 configured to store data characterizing transaction-related information in connection with a plurality of distinct users and/or customers. The database 106 more particularly stores quote- and order-related data 107 illustratively comprising information associated with quotes and orders such as sales representative identify, customer identity, product, cost, revenue, margin, quantity, temporal parameters, etc.

The database 106 in the present embodiment is implemented using one or more storage systems associated with the large order management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the large order management system 105 are input-output devices 108, which illustratively comprise keyboards, displays or other types of input-output devices in any combination. Such input-output devices are used to support one or more user interfaces to the large order management system 105, as well as to support communication between the large order management system 105 and other related systems and devices not explicitly shown.

The large order management system 105 in the FIG. 1 embodiment is assumed to be implemented using at least one processing device. Each such processing device generally comprises at least one processor and an associated memory, and implements one or more functional modules for controlling certain features of the large order management system 105.

More particularly, the large order management system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the large order management system 105 to communicate over the network 104 with the user devices 102, and illustratively comprises one or more conventional transceivers.

The processor 120 further comprises a transaction quote classifier 130, a conversion supportability determinator 132, and a fulfillment guidance generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the transaction quote classifier 130, conversion supportability determinator 132, and fulfillment guidance generator 134 may be implemented at least in part in the form of software that is stored in memory 122 and executed by processor 120.

It is to be understood that the particular set of elements shown in FIG. 1 for proactively predicting large orders and providing fulfillment support related thereto involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the large order management system 105 can be eliminated and associated elements such as transaction quote classifier 130, conversion supportability determinator 132, and fulfillment guidance generator 134 can be implemented elsewhere in the computer network 100.

An exemplary process utilizing transaction quote classifier 130, conversion supportability determinator 132, and fulfillment guidance generator 134 of the large order management system 105 in computer network 100 will be described in more detail with reference to the flow diagram of FIG. 5.

Figure 2:
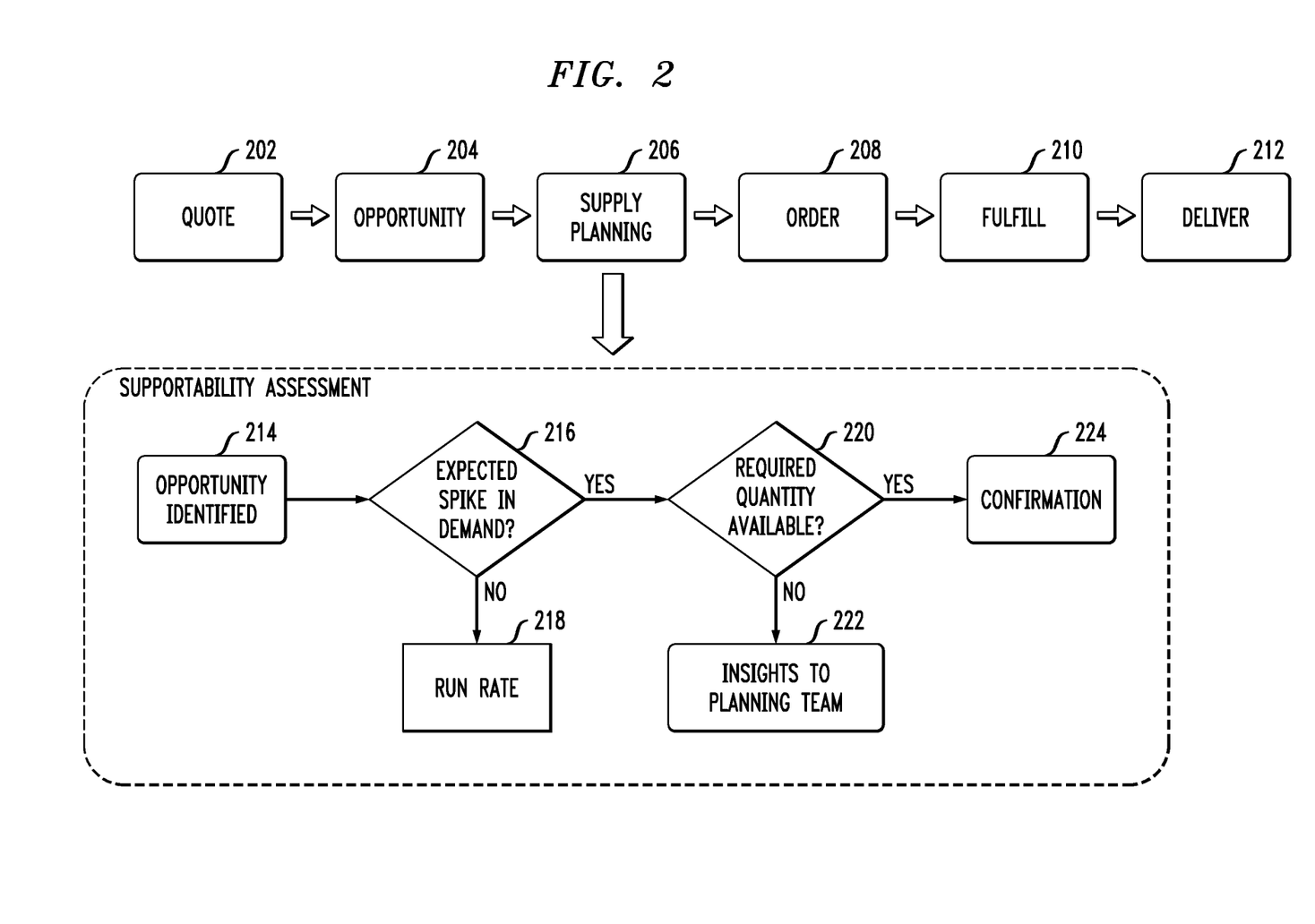
FIG. 2 shows a flow diagram of a process for assessing quote supportability in an illustrative embodiment.

FIG. 2 shows a flow diagram of a process for assessing quote supportability in an illustrative embodiment. By way of illustration, the process includes step 202 through step 212, as described as follows. Step 202 includes obtaining a quote from a customer, and step 204 includes identifying a related commercial opportunity (that is, a deal between a customer and a sales representative based on one or more requirements). Step 206 includes supply planning based on the quote and identified opportunity, and step 208 includes generating an order based on the quote, opportunity and supply planning considerations. Further, step 210 includes fulfilling the order, and step 212 includes delivering the ordered goods and/or services to the customer.

As also depicted in FIG. 2, in at least one embodiment of the invention, step 206 includes sub-step 214 through sub-step 224, in connection with carrying out a supportability assessment. Specifically, based on an identified opportunity 214 (identified in conjunction with step 204, as noted above), step 216 includes determining whether a spike in demand is expected. If no (that is, a spike in demand is not expected), then step 218 includes computing a run rate (that is, future inventory requirements based on normal order flow). If yes (that is, a spike in demand is expected), then step 220 includes determining whether the required quantity (from the quote obtained in step 202) is available.

If the answer to the query in step 220 is no (that is, the required quantity is not available), then step 222 includes generating and providing insights to a planning team. Such insights can include, for example, one or more needed and/or required inventory parts, and the required quantity fur such parts per some temporal basis (once, every week, etc.). If the answer to the query in step 220 is yes (that is, the required quantity is available), the step 224 includes generating and outputting a confirmation, and subsequently proceeding to step 208.

In conjunction with the supportability assessment illustrated in FIG. 2, one or more embodiments of the invention can include implementing a model that predicts the possibility and/or plausibility of converting a received quote into a normal order or a large order. In one or more embodiments of the invention, the distinction between a "normal" order and a "large" order can be made on one or more bases. For example, a "large" order can be distinguished from a "normal" order on the basis of the monetary value of the order exceeding a pre-determined threshold. Additionally, a "large" order can be distinguished from a "normal" order on the basis of a unit volume associated with the order exceeding a pre-determined threshold. Further, a "large" order can be distinguished from a "normal" order on the basis of one or more different shipping and/or delivery methods associated with the order. Also, it is to be appreciated that in one or more embodiments of the invention, one or more bases for distinguishing a "large" order from a "normal" order can be determined and implemented by a user.

If the quote is predicted to be a large order, the model further predicts the supportability of the quote and feedback is generated and output to the sales representative (who initially obtained the quote). The sales representative can then take one or more actions while entering a confidence score pertaining to the conversion of the quote to a fulfilled order. The confidence score, in one or more embodiments of the invention, can be generated via a categorical boosting algorithm and provided to the sales representative as a percentage value in the range of 0% confidence to 100% confidence.

In connection with predicting the supportability of the quote, such an embodiment of the invention can include generating and/or providing information to one or more planners regarding the procurement of one or more necessary parts and/or components, as well as quantities thereof, in order to ultimately fulfill the quote/order. Additionally, (for example, as noted in step 222 of FIG. 2) insights can be generated and output related to which attributes of the quote impact (as well as the level of impact corresponding thereto) supportability of the quote. Such insights can also include, for example, information pertaining to adjusting a threshold of demand in order to avoid a particular shortage or a surplus. Also, such insights can be based on past fulfillments, expected normal and abnormal demands, etc.

In one or more embodiments of the invention, generating a model such as detailed above includes analyzing historical large order supportability data, inventory availability, and one or more additional attributes that can potentially influence fulfilling a large order. Such additional attributes can include, for example, sales representative identity, product, model, geographic region, etc. Further, such a model can also be implemented to proactively distinguish a demand spike due to normal demands from a demand spike due to abnormal demands, which can assist in accurate forecasting.

Figure 3:
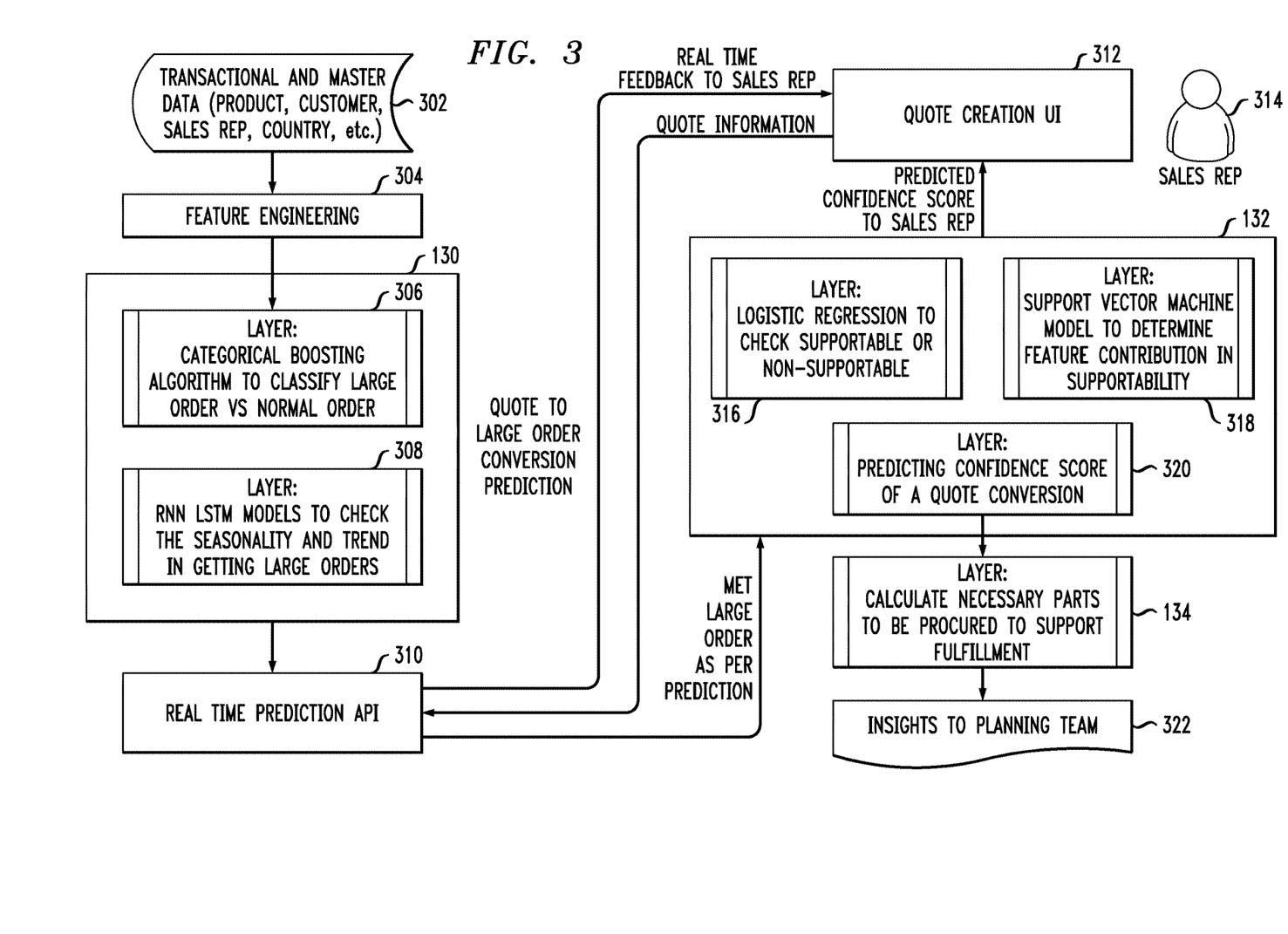
FIG. 3 shows system architecture for large order prediction and fulfillment support generation, in an illustrative embodiment of the invention.

FIG. 3 shows system architecture for large order prediction and fulfillment support generation, in an illustrative embodiment of the invention. By way of illustration, FIG. 3 depicts transactional and master data 302 related to products, customers, sales representatives (reps), countries, etc. Such data 302 are processed by a feature engineering component 304, which subsequently provides input based on such processing to transaction quote classifier 130. The feature engineering component 304 prepares a dataset for the model to consume, which can include tasks such as converting all rules into features. For example, a rule can indicate that an order is a large order (1) if the monetary value of the sale is greater than $100,000.00; otherwise, the order is a normal order (0). Such a rule can then be provided as a feature according to the following example table:

| Customer ID | Amount ($) | Quantity | Sales Rep ID | y_variable |
|---|---|---|---|---|
| 21574856 | 10000 | 610 | 67593 | 1 |
| 12767723 | 123765 | 450 | 23878 | 1 |
| 12173042 | 32145 | 210 | 19943 | 0 |

As depicted in FIG. 3, the transaction quote classifier 130 includes layer 306 and layer 308. Layer 306 includes a categorical boosting algorithm to classify a quote (using the inputs provided by feature engineering component 304) as a large order or a normal order. In one or more embodiments of the invention, such a categorical boosting algorithm can, to avoid over-fitting of data (such as by considering only attributes such as quantity and/or amount), consider multiple input attributes (such as sales representative identity, customer identity, product, cost, revenue, margin, quantity, temporal parameters, etc.) and use a bias of a model as input in a recurrent way while generating predictions.

Referring again to the transaction quote classifier 130 as depicted in FIG. 3, layer 308 includes a recurrent neural network (RNN) with long short-term memory (LSTM) models (which can store long sequences in memory), which can be implemented to determine, per each customer, seasonality and trend considerations in connection with generating and/or obtaining large orders.

Based on the processing carried out by layer 306 and layer 308, the transaction quote classifier 130 generates a prediction of whether a given quote is potentially a normal order or potentially a large order, and such prediction is then output via a real-time prediction application programming interface (API) 310. The prediction is then provided to a quote creation user interface (UI) 312 (which can return quote information to the prediction API 310), which can be implemented in conjunction with a relevant sales representative 314. The prediction can also be provided to conversion supportability determinator 132, which includes layer 316, layer 318, and layer 320. Layer 316 includes a logistic regression to determine supportability or non-supportability of the predicted large order. Specifically, in one or more embodiments of the invention, layer 316 can apply a multivariate logistic regression algorithm to determine the coefficient of each attribute contribution to supportability of the predicted large order, wherein such an algorithm is trained in a manner similar to the following example set of equations:

$$x = B0 + B1 \text{ (Customer\_number)} + B2 \text{ (Sales\_rep)} + B3 \text{ (Amount)} + B4 \text{ (Quote\_confidence)} + B5 \text{ (Product Line of Business)} + B6 \text{ (Family Parent)} + B7 \text{ (Location)} + B8 \text{ (Quantity)} + B9 \text{ (Build\_Location)};$$

$$P \text{ (Probability of supportability)} = e^x/(1+e^x);$$

$$Q = 1 - P = 1 - (e^x/(1+e^x));$$

$$P/(1-P) = e^x;$$

Log($P/(1 - P)$)=$x$; wherein $x$ represents the dependent variable (supportability or non-supportability; 1/0) that is being fitted, $e$ represents an exponential function, and $Q$ represents an inverse probability.

Layer 318 includes implementing a support vector machine (SVM) model to determine the level of contribution of each of one or more order-related features to the supportability/non-supportability determination. In one or more embodiments of the invention, layer 318 can specifically include using an SVM model to calculate the distance from the mean for each attribute, and providing insights on the attributes that contribute towards supportability or non-supportability of the predicted large order so that management, planners, and/or a sales team can take strategic decisions related to fulfillment and/or future orders. The mean, as noted above, can be calculated for all orders against each line of business, as well as the distance from each attribute to the mean. If the calculated distance exceeds a given threshold, at least one embodiment of the invention includes inferring that there is a high contribution towards converting a particular large order (or not converting the large order). Additionally, layer 320 includes predicting and/or determining a confidence score (indicated, for example, by value P (probability of supportability) in the above equations) attributed to successful conversion of the quote to a fulfilled order.

As also depicted in FIG. 3, the confidence score determined by layer 320 can be provided to the quote creation UI 312 as well as to fulfillment guidance generator 134, which can calculate and/or determine any necessary parts or components to be procured to support fulfillment. Based on such determinations, the fulfillment guidance generator 134 can generate and output one or more insights 322 to a planning team (as described above and herein).

Figure 4:
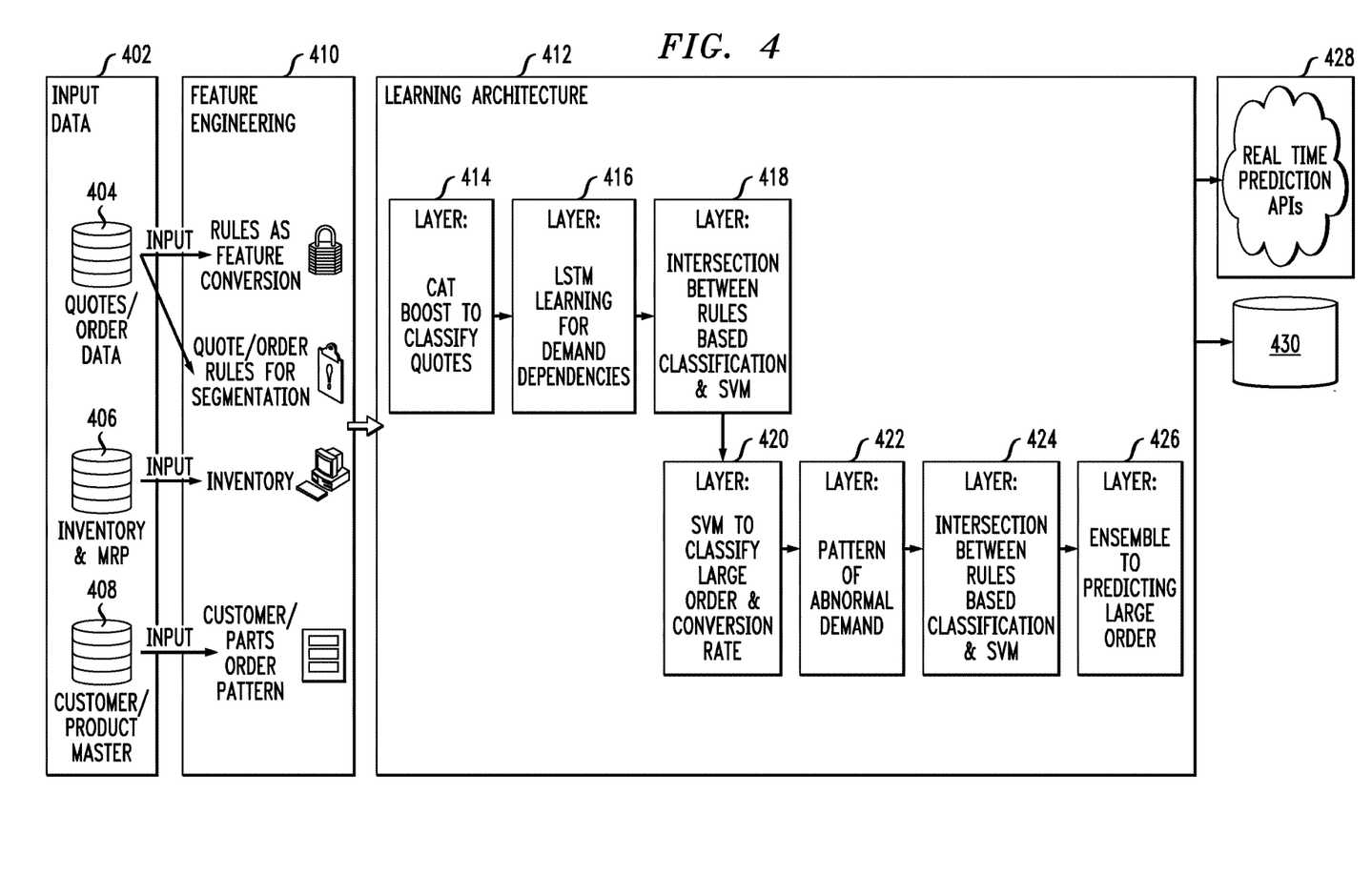
FIG. 4 shows system architecture for large order prediction and fulfillment support generation, in an illustrative embodiment of the invention.

FIG. 4 shows system architecture for large order prediction and fulfillment support generation, in an illustrative embodiment of the invention. By way of illustration, FIG. 4 depicts input data 402, which include quote and order data 404 (which can include information pertaining to supportability of a quote based on features such as sales representative identity, customer identity, customer location, product hierarchy, build location contribution, etc.), inventory and manufacturing resource planning data 406 (which can include information pertaining to parts or components necessary to fulfill one or more orders), and customer and product master data 408 (which can include information such as customer location, sales representative identity, etc.).

As illustrated, FIG. 4 also depicts a feature engineering component 410, which can generate rules and/or information related to orders and order fulfilling. For example, based on quote and order data 404, the feature engineering component 410 can generate one or more rules pertaining to feature conversion and one or more quote/order rules for segmentation. With respect to feature conversion, instead of providing direct rules, one or more embodiments of the invention can include providing rules as data from which the model is to learn. For example, instead of directly providing a rule that states "A sales amount exceeding $6,000.00 indicates a large order," such an embodiment of the invention includes providing data such as "An order with a sales amount or $10,000.00 is a large order, while an order with a sales amount of $5,000.00 is a normal order," etc. Additionally, segmentation, as noted above, can include segmenting orders and/or quotes on the basis of large order/normal and further based on attributes such as product(s), model(s), amount, quantity, etc.

Also, based on inventory and manufacturing resource planning data 406, the feature engineering component 410 can generate a present inventory catalogue. Further, based on customer and product master data 408, the feature engineering component 410 can generate order patterns associated with customers and/or parts.

Such outputs generated by the feature engineering component 410 can be provided to a learning architecture 412, which includes layer 414, layer 416, layer 418, layer 420, layer 422, layer 424 and layer 426. Layer 414 includes a categorical boosting method which predicts the probability of a quote converting to a large order or a normal order. Such a prediction can then be provided to layer 416, which includes an RNN with an LSTM model, which can be implemented for learning demand dependencies based on trends and seasonality of a quote. Such learned demand dependencies can be provided to layer 418, which includes an intersection between rules-based classification and SVMs (that is, considering and/or combining both rule-based outputs as well as model outputs in distinguishing a normal order from a large order).

Layer 418 provides an output that can be used by layer 420 to classify a large order and determine an estimated conversion rate related thereto, for example, by determining which attributes contribute positively or negatively to supportability of such an order. Based on such classifications and/or determinations, layer 422 can determine one or more patterns of abnormal demand, which can include predicting which components (and the quantity or quantities thereof) need to be procured for fulfillment. Such determinations can then be utilized by layer 424, which includes an intersection between rules-based classification and SVMs. Additionally, layer 424 provides an output that can be used by layer 426, which implements an ensemble for predicting large orders. Rather than making manual decisions, such as, for example, "If distance is ≥0.5, then the probability of an order being a large order is increased," layer 426 derives one or more new decisions based on a voting-based ensemble algorithm, which functions based on a combination of both SVM and logistic regression.

As also depicted in FIG. 4, the learning architecture can generate outputs related to large order predictions and fulfillment guidance related thereto, and store such outputs in a database 430 as well as provide such outputs to one or more real-time prediction APIs 428. Moreover, in one or more embodiments of the invention, the learning architecture 412 can be invoked (for example, by a sales representative) via an API (such as 428) while creating a quote.

Figure 5:
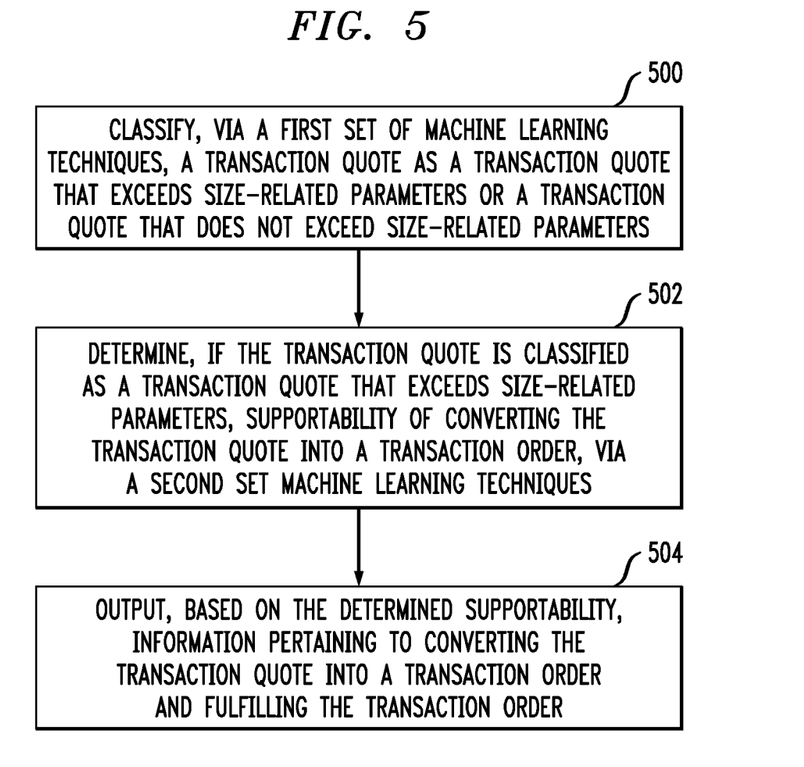
FIG. 5 is a flow diagram of a process for proactively predicting large orders and providing fulfillment support related thereto, in an illustrative embodiment.

FIG. 5 is a flow diagram of a process for proactively predicting large orders and providing fulfillment support related thereto, in an illustrative embodiment. It is to be understood that this particular process is only an example, and additional or alternative processes can be carried out in other embodiments.

In this embodiment, the process includes steps 500 through 504. These steps are assumed to be performed by the processor 120 utilizing its modules 130, 132, and 134.

Step 500 includes classifying a transaction quote as a transaction quote that exceeds one or more size-related parameters or a transaction quote that does not exceed the one or more size-related parameters, wherein classifying comprises applying a first set of one or more machine learning techniques to the transaction quote and one or more variables related to the transaction quote. The one or more variables related to the transaction quote can include stock keeping unit information, geographic information, temporal information, customer information, quote quantity information, and/or sales representative information. Additionally, the first set of one or more machine learning techniques can include a categorical boosting algorithm, a recurrent neural network model, and/or a long short-term memory model.

Step 502 includes determining, if the transaction quote is classified as a transaction quote that exceeds one or more size-related parameters, supportability of converting the transaction quote into a transaction order, wherein determining supportability comprises applying a second set of one or more machine learning techniques to multiple attributes related to converting the transaction quote into a transaction order. Applying the second set of one or more machine learning techniques can include applying a logistic regression model to the multiple attributes related to converting the transaction quote into a transaction order. Also, the multiple attributes can include historical transaction order supportability data and/or inventory availability.

Further, applying the second set of one or more machine learning techniques can include applying one or more support vector machines to the multiple attributes related to converting the transaction quote into a transaction order. Applying the one or more support vector machines to the multiple attributes can include determining an amount for which each of the multiple attributes contribute to supportability of converting the transaction quote into a transaction order.

Step 504 includes outputting, based on the determined supportability, information pertaining to converting the transaction quote into a transaction order and fulfilling the transaction order to one or more entities associated with transaction order fulfillment. The one or more entities associated with order fulfillment can include, for example, one or more sales representatives. Also, the one or more entities associated with order fulfillment can include one or more planners, and the information pertaining to converting the transaction quote into a transaction order and fulfilling the transaction order can include information regarding procurement of one or more components of the transaction order required for fulfilling the transaction order. Additionally, in one or more embodiments of the invention, the information pertaining to converting the transaction quote into a transaction order and fulfilling the transaction order can include information pertaining to adjusting a demand threshold.

The techniques depicted in FIG. 5 can also include generating a confidence score pertaining to converting the transaction quote into a transaction order and fulfilling the transaction order, and wherein the information comprises the generated confidence score.

Accordingly, the particular processing operations and other network functionality described in conjunction with the flow diagram of FIG. 5 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional order management approaches. For example, some embodiments are configured to determine trends with respect to large orders and predict supportability conversion rates with drill-down views. These and other embodiments can effectively reduce order fulfillment delays, thereby increasing brand reliability and customer experience quality.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines (VMs) implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Service (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
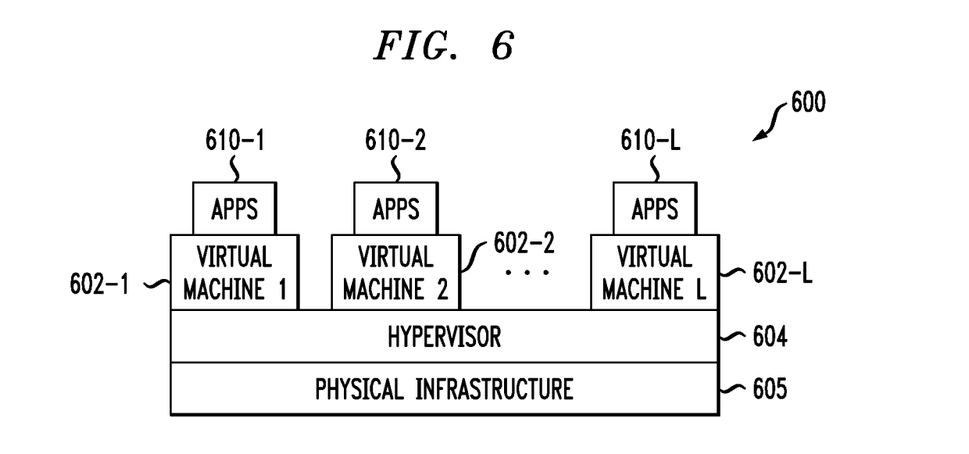
FIGS. 6 and 7 show examples of processing platforms that may be utilized to implement at least a portion of an information processing system in illustrative embodiments.
Figure 7:
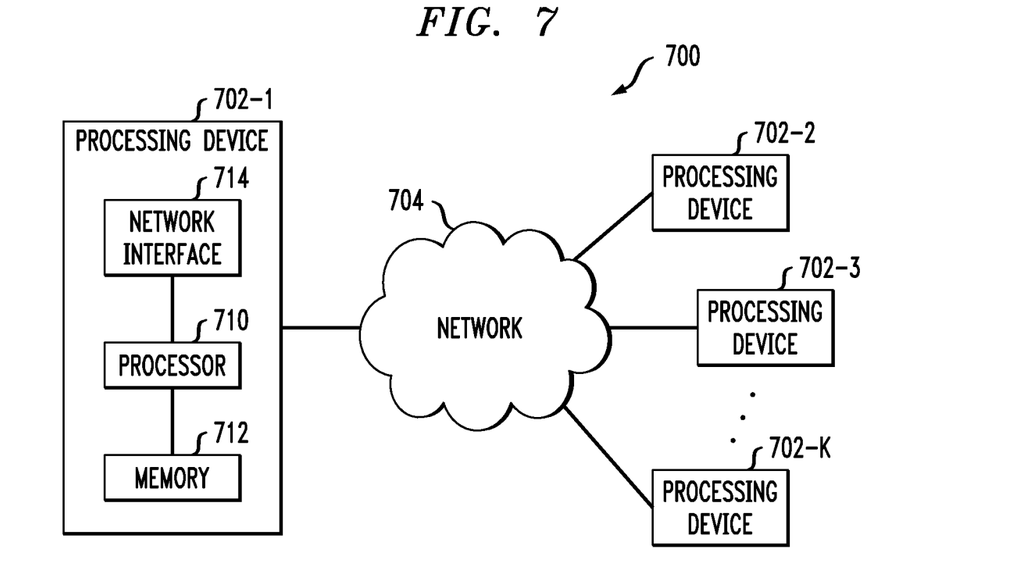

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises VMs 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to proactively predict large orders and provide fulfillment support related thereto. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
    classifying a transaction quote as a transaction quote that exceeds one or more size- related parameters or a transaction quote that does not exceed the one or more size-related parameters, wherein classifying comprises determining dependencies based at least in part on one or more trends and seasonality information related to the transaction quote by processing the transaction quote and variables related to the transaction quote using a first set of one or more machine learning techniques comprising a recurrent neural network which includes one or more long short-term memory models;
    training, using (i) a log function based at least in part on an exponential function and an inverse probability and (ii) historical attribute data pertaining to at least stock keeping unit information, geographic information, temporal information, customer information, quote quantity information, and sales representative information, at least one trained multivariate logistic regression algorithm for determining coefficients of attribute contribution to supportability of converting a transaction quote into a transaction order;
    determining, if the transaction quote is classified as a transaction quote that exceeds one or more size-related parameters, supportability of converting the transaction quote into a transaction order, wherein determining supportability comprises applying a second set of one or more machine learning techniques to multiple attributes related to converting the transaction quote into a transaction order, wherein applying the second set of one or more machine learning techniques comprises determining levels of contributions to supportability for the multiple attributes by processing data related to the multiple attributes using at least one support vector machine model to calculate distances from a mean for the multiple attributes and (ii) the at least one trained multivariate logistic regression algorithm to determine a coefficient of each attribute contribution, across the multiple attributes, to supportability of converting the transaction quote into a transaction order; and
    outputting, based on the determined supportability, information pertaining to converting the transaction quote into a transaction order and fulfilling the transaction order to one or more entities associated with transaction order fulfillment;
    wherein the method is performed by at least one processing device comprising a processor coupled to a memory.

2. The computer-implemented method of claim 1, wherein classifying the transaction quote comprises using a categorical boosting algorithm.

3. The computer-implemented method of claim 1, wherein the multiple attributes comprise historical transaction order supportability data.

4. The computer-implemented method of claim 1, wherein the multiple attributes comprise inventory availability.

5. The computer-implemented method of claim 1, wherein the one or more entities associated with order fulfillment comprise one or more sales representatives.

6. The computer-implemented method of claim 1, further comprising:
    generating a confidence score pertaining to converting the transaction quote into a transaction order and fulfilling the transaction order, and wherein the information comprises the generated confidence score.

7. The computer-implemented method of claim 1, wherein the one or more entities associated with order fulfillment comprise one or more planners, and wherein the information comprises information regarding procurement of one or more components of the transaction order required for fulfilling the transaction order.

8. The computer-implemented method of claim 1, wherein the information comprises information pertaining to adjusting a demand threshold.

9. A non-transitory processor-readable storage medium having stored therein program code of one or more software programs, wherein the program code when executed by at least one processing device causes said at least one processing device:
    to classify a transaction quote as a transaction quote that exceeds one or more size-related parameters or a transaction quote that does not exceed the one or more size-related parameters, wherein classifying comprises determining dependencies based at least in part on one or more trends and seasonality information related to the transaction quote by processing the transaction quote and variables related to the transaction quote using a first set of one or more machine learning techniques comprising a recurrent neural network which includes one or more long short-term memory models;
    to train, using (i) a log function based at least in part on an exponential function and an inverse probability and (ii) historical attribute data pertaining to at least stock keeping unit information, geographic information, temporal information, customer information, quote quantity information, and sales representative information, at least one trained multivariate logistic regression algorithm for determining coefficients of attribute contribution to supportability of converting a transaction quote into a transaction order;
    to determine, if the transaction quote is classified as a transaction quote that exceeds one or more size-related parameters, supportability of converting the transaction quote into a transaction order, wherein determining supportability comprises applying a second set of one or more machine learning techniques to multiple attributes related to converting the transaction quote into a transaction order, wherein applying the second set of one or more machine learning techniques comprises determining levels of contributions to supportability for the multiple attributes by processing data related to the multiple attributes using at least one support vector machine model to calculate distances from a mean for the multiple attributes and (ii) the at least one trained multivariate logistic regression algorithm to determine a coefficient of each attribute contribution, across the multiple attributes, to supportability of converting the transaction quote into a transaction order; and to output, based on the determined supportability, information pertaining to converting the transaction quote into a transaction order and fulfilling the transaction order to one or more entities associated with transaction order fulfillment.

10. The non-transitory processor-readable storage medium of claim 9, wherein classifying the transaction quote comprises using a categorical boosting algorithm.

11. An apparatus comprising:
at least one processing device comprising a processor coupled to a memory;
said at least one processing device being configured:
to classify a transaction quote as a transaction quote that exceeds one or more size-related parameters or a transaction quote that does not exceed the one or more size-related parameters, wherein classifying comprises determining dependencies based at least in part on one or more trends and seasonality information related to the transaction quote by processing the transaction quote and variables related to the transaction quote using a first set of one or more machine learning techniques comprising a recurrent neural network which includes one or more long short-term memory models;
to train, using (i) a log function based at least in part on an exponential function and an inverse probability and (ii) historical attribute data pertaining to at least stock keeping unit information, geographic information, temporal information, customer information, quote quantity information, and sales representative information, at least one trained multivariate logistic regression algorithm for determining coefficients of attribute contribution to supportability of converting a transaction quote into a transaction order;
to determine, if the transaction quote is classified as a transaction quote that exceeds one or more size-related parameters, supportability of converting the transaction quote into a transaction order, wherein determining supportability comprises applying a second set of one or more machine learning techniques to multiple attributes related to converting the transaction quote into a transaction order, wherein applying the second set of one or more machine learning techniques comprises determining levels of contributions to supportability for the multiple attributes by processing data related to the multiple attributes using (i) at least one support vector machine model to calculate distances from a mean for the multiple attributes and (ii) the at least one trained multivariate logistic regression algorithm to determine a coefficient of each attribute contribution, across the multiple attributes, to supportability of converting the transaction quote into a transaction order; and to output, based on the determined supportability, information pertaining to converting the transaction quote into a transaction order and fulfilling the transaction order to one or more entities associated with transaction order fulfillment.

12. The apparatus of claim 11, wherein classifying the transaction quote comprises using a categorical boosting algorithm.

13. The apparatus of claim 11, wherein the one or more entities associated with order fulfillment comprise one or more planners, and wherein the information comprises information regarding procurement of one or more components of the transaction order required for fulfilling the transaction order.

14. The non-transitory processor-readable storage medium of claim 9, wherein the one or more entities associated with order fulfillment comprise one or more planners, and wherein the information comprises information regarding procurement of one or more components of the transaction order required for fulfilling the transaction order.

15. The non-transitory processor-readable storage medium of claim 9, wherein the program code when executed by the at least one processing device causes the at least one processing device:
to generate a confidence score pertaining to converting the transaction quote into a transaction order and fulfilling the transaction order, and wherein the information comprises the generated confidence score.

16. The apparatus of claim 11, wherein the at least one processing device is further configured:
to generate a confidence score pertaining to converting the transaction quote into a transaction order and fulfilling the transaction order, and wherein the information comprises the generated confidence score.

17. The apparatus of claim 11, wherein the multiple attributes comprise historical transaction order supportability data.

18. The apparatus of claim 11, wherein the multiple attributes comprise inventory availability.

19. The non-transitory processor-readable storage medium of claim 9, wherein the multiple attributes comprise historical transaction order supportability data.

20. The non-transitory processor-readable storage medium of claim 9, wherein the multiple attributes comprise inventory availability.

* * * * *